(12) United States Patent
Chandra et al.

(10) Patent No.: US 7,002,903 B2
(45) Date of Patent: Feb. 21, 2006

(54) AUTOMATIC VERIFICATION OF WALSH CODE ORTHOGONALITY

(75) Inventors: Satish Chandra, Naperville, IL (US); Patrice I. Godefroid, Naperville, IL (US); Christopher D. Palm, Naperville, IL (US); Steven M. Welsh, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 867 days.

(21) Appl. No.: 09/863,857

(22) Filed: May 23, 2001

(65) Prior Publication Data

US 2002/0176384 A1 Nov. 28, 2002

(51) Int. Cl.
*H04J 11/00* (2006.01)
(52) U.S. Cl. .................................. 370/209; 370/342
(58) Field of Classification Search ................ 370/335, 370/441, 204, 208, 209, 280, 252, 342; 375/146; 341/96; 455/450
See application file for complete search history.

(56) References Cited

U.S. PATENT DOCUMENTS

| | | | | |
|---|---|---|---|---|
| 5,675,581 A | * | 10/1997 | Soliman | 370/252 |
| 5,805,567 A | * | 9/1998 | Ramesh | 370/204 |
| 5,903,551 A | * | 5/1999 | Kingston et al. | 370/335 |
| 6,147,964 A | * | 11/2000 | Black et al. | 370/209 |
| 6,185,246 B1 | * | 2/2001 | Gilhousen | 370/342 |
| 6,215,762 B1 | * | 4/2001 | Dent | 370/208 |
| 6,490,453 B1 | * | 12/2002 | Lee et al. | 455/450 |
| 6,639,902 B1 | * | 10/2003 | Mennekens et al. | 370/280 |
| 6,680,928 B1 | * | 1/2004 | Dent | 370/342 |
| 6,700,881 B1 | * | 3/2004 | Kong et al. | 370/335 |
| 2002/0057727 A1 | * | 5/2002 | Li | 375/146 |
| 2002/0171568 A1 | * | 11/2002 | Yang | 341/96 |
| 2002/0172168 A1 | * | 11/2002 | Meier et al. | 370/335 |

* cited by examiner

Primary Examiner—Bob A. Phunkulh (57) ABSTRACT

A method of verifying that a CDMA code allocator maintains mutual orthogonality between all concurrently busy codes includes the steps of identifying a code being allocated by the allocator, and determining if the identified code is busy. It is also determined if any ancestral parent of the identified code is busy, and if any descendant of the identified code is busy. If the identified code, one of the identified code's ancestral parents, or one of the identified code's descendants is determined to be busy, then an error in allocator operation is indicated.

16 Claims, 7 Drawing Sheets

| $W_k^N$ | N=4 | N=8 | N=16 | N=32 | N=64 | N=128 |
|---|---|---|---|---|---|---|
| k | 0 | 0 | 0 | 0 | 0 | 0 |
| | | | | | | 64 |
| | | | | | 32 | 32 |
| | | | | | | 96 |
| | | | | | 16 | 16 |
| | | | | 16 | | 80 |
| | | | | | 48 | 48 |
| | | | | | | 112 |
| | | | | | 8 | 8 |
| | | | | 8 | | 72 |
| | | | | | 40 | 40 |
| | | | 8 | | | 104 |
| | | | | | 24 | 24 |
| | | | | 24 | | 88 |
| | | | | | 56 | 56 |
| | | | | | | 120 |
| | | | | | 4 | 4 |
| | | | | 4 | | 68 |
| | | | | | 36 | 36 |
| | | | 4 | | | 100 |
| | | | | | 20 | 20 |
| | | | | 20 | | 84 |
| | | | | | 52 | 52 |
| | | 4 | | | | 116 |
| | | | | | 12 | 12 |
| | | | | 12 | | 76 |
| | | | | | 44 | 44 |
| | | | 12 | | | 108 |
| | | | | | 28 | 28 |
| | | | | 28 | | 92 |
| | | | | | 60 | 60 |
| | | | | | | 124 |

FIG. 2B

| $W_k^N$ | N=4 | N=8 | N=16 | N=32 | N=64 | N=128 |
|---|---|---|---|---|---|---|
| k | 1 | 1 | 1 | 1 | 1 | 1 |
| | | | | | | 65 |
| | | | | | 33 | 33 |
| | | | | | | 97 |
| | | | | 17 | 17 | 17 |
| | | | | | | 81 |
| | | | | | 49 | 49 |
| | | | | | | 113 |
| | | | 9 | 9 | 9 | 9 |
| | | | | | | 73 |
| | | | | | 41 | 41 |
| | | | | | | 105 |
| | | | | 25 | 25 | 25 |
| | | | | | | 89 |
| | | | | | 57 | 57 |
| | | | | | | 121 |
| | | 5 | 5 | 5 | 5 | 5 |
| | | | | | | 69 |
| | | | | | 37 | 37 |
| | | | | | | 101 |
| | | | | 21 | 21 | 21 |
| | | | | | | 85 |
| | | | | | 53 | 53 |
| | | | | | | 117 |
| | | | 13 | 13 | 13 | 13 |
| | | | | | | 77 |
| | | | | | 45 | 45 |
| | | | | | | 109 |
| | | | | 29 | 29 | 29 |
| | | | | | | 93 |
| | | | | | 61 | 61 |
| | | | | | | 125 |

FIG. 2C

| $W_k^N$ | N=4 | N=8 | N=16 | N=32 | N=64 | N=128 |
|---|---|---|---|---|---|---|
| k | 2 | 2 | 2 | 2 | 2 | 2 |
| | | | | | | 66 |
| | | | | | 34 | 34 |
| | | | | | | 98 |
| | | | | | 18 | 18 |
| | | | | 18 | | 82 |
| | | | | | 50 | 50 |
| | | | | | | 114 |
| | | | | | 10 | 10 |
| | | | | 10 | | 74 |
| | | | 10 | | 42 | 42 |
| | | | | | | 106 |
| | | | | | 26 | 26 |
| | | | | 26 | | 90 |
| | | | | | 58 | 58 |
| | | | | | | 122 |
| | | 6 | | | 6 | 6 |
| | | | | 6 | | 70 |
| | | | | | 38 | 38 |
| | | | | | | 102 |
| | | | 6 | | 22 | 22 |
| | | | | 22 | | 86 |
| | | | | | 54 | 54 |
| | | | | | | 118 |
| | | | | | 14 | 14 |
| | | | | 14 | | 78 |
| | | | | | 46 | 46 |
| | | | | | | 110 |
| | | | | | 30 | 30 |
| | | | | 30 | | 94 |
| | | | | | 62 | 62 |
| | | | | | | 126 |

FIG. 2D

| $W_k^N$ | N=4 | N=8 | N=16 | N=32 | N=64 | N=128 |
|---|---|---|---|---|---|---|
| k | 3 | 3 | 3 | 3 | 3 | 3 |
| | | | | | | 67 |
| | | | | | 35 | 35 |
| | | | | | | 99 |
| | | | | | 19 | 19 |
| | | | | 19 | | 83 |
| | | | | | 51 | 51 |
| | | | | | | 115 |
| | | | | | 11 | 11 |
| | | | | 11 | | 75 |
| | | | | | 43 | 43 |
| | | | | | | 107 |
| | | | 11 | | 27 | 27 |
| | | | | | | 91 |
| | | | | 27 | 59 | 59 |
| | | | | | | 123 |
| | | 7 | | | 7 | 7 |
| | | | | | | 71 |
| | | | | 7 | 39 | 39 |
| | | | | | | 103 |
| | | | 7 | | 23 | 23 |
| | | | | | | 87 |
| | | | | 23 | 55 | 55 |
| | | | | | | 119 |
| | | | | | 15 | 15 |
| | | | | 15 | | 79 |
| | | | | | 47 | 47 |
| | | | | | | 111 |
| | | | 15 | | 31 | 31 |
| | | | | | | 95 |
| | | | | 31 | 63 | 63 |
| | | | | | | 127 |

FIG. 4

AUTOMATIC VERIFICATION OF WALSH CODE ORTHOGONALITY

BACKGROUND OF THE INVENTION

The present invention relates to the art of wireless telecommunication networks. It finds particular application in conjunction with third generation (3G) wireless systems using code division multiple access (CDMA) technology, and will be described with particular reference thereto. However, it is to be appreciated that the present invention is also amenable to other like applications.

Walsh codes, spreading codes, channelization codes and the like are generally known in the art of wireless telecommunication networks. In particular, Walsh codes and/or Walsh functions are based on the Walsh-Hadamard matrices. However, for simplicity herein, the terms Walsh code and/or Walsh function are used to refer generally to any similarly employed spreading codes/functions, channelization codes/functions, etc. In CDMA, Walsh functions are used in a forward direction to organize network traffic over an air interface into different channels that can be isolated and decoded by target mobiles, e.g., wireless telephones, wireless personal digital assistants (PDAs) or other wireless devices. The forward or downlink direction refers to a transmitting direction from a base station to a mobile station.

At any given time for the same sector/carrier within a given cell site of a wireless telecommunications network, all the Walsh codes in use have to be mutually orthogonal with each other in order to properly organize the network traffic without dropped calls, interference or cross-talk between the different channels. This restriction was not particularly problematic for second generation wireless systems using CDMA. Second generation wireless generally encompasses the so called digital personal communications service (PCS). In any event, $2^{nd}$ generation systems using CDMA only employ Walsh codes of a single size or bit length and all the codes used are guaranteed to be orthogonal to one another. For example, 64 Walsh codes each 64 bits in length are used in the typical implementation of $2^{nd}$ generation systems.

As opposed to the $2^{nd}$ generation, 3G wireless systems employing CDMA use Walsh codes of varying sizes or bit lengths. For example, traffic such as voice calls typically continue to use 64-bit Walsh codes. However, in 3G, some voice calls or traffic may use 128-bit Walsh codes. Similarly, for high-speed data traffic (e.g., wireless Internet access), 3G wireless makes available a variety of Walsh codes with shorter lengths, e.g., 32, 16, 8 and 4 bit lengths. Accordingly, unlike the $2^{nd}$ generation which uses uniformly sized Walsh codes, Walsh code allocation in 3G CDMA wireless is not trivial. Walsh code allocation refers to the selection and/or assignment of Walsh codes for the different channels of cell traffic. Generally, it is preferable to employ shorter bit length Walsh codes for higher speed traffic.

In 3G CDMA wireless, variable size Walsh codes are made available for use. Consequently, all the available Walsh codes for the same sector/carrier within a given cell site are not guaranteed to be mutually orthogonal and their allocation fails to be a trivial matter. More specifically, each Walsh function in the set of Walsh functions having a bit length or size of N is non-orthogonal to: two Walsh functions in the set of Walsh functions of size 2N; four Walsh functions in the set of Walsh functions of size 4N; eight Walsh functions in the set of Walsh functions of size 8N; and so on. In particular, $W_k^N$ is non-orthogonal to:

$W_k^{2N}$ and $W_{(k+N)}^{2N}$;

$W_k^{4N}, W_{(k+N)}^{4N}, W_{(k+2N)}^{4N}$ and $W_{(k+3N)}^{4N}$;

$W_k^{8N}, W_{(k+N)}^{8N}, W_{(k+2N)}^{8N}, W_{(k+3N)}^{8N}, W_{(k+4N)}^{8N}, W_{(k+5N)}^{8N}, W_{(k+6N)}^{8N}$ and $W_{(k+7N)}^{8N}$;

...

$W_{(k)}^{(2^n)N}, W_{(k+N)}^{(2^n)N}, W_{(k+2N)}^{(2^n)N}, W_{(k+3N)}^{(2^n)N}, W_{(k+4N)(2^n)N}^{(2^n)N} \ldots$ and $W_{(k+((2^n)-1)N)}^{(2^n)N}$;

Regarding notation, $W^N$ represents the set of Walsh functions/codes having a size or bit length of N, and $W_k^N$ represents the $k^{th}$ element of $W^N$ (note: the number or value of k used to reference a particular element does not necessarily equate to the binary representation of the corresponding Walsh code).

Accordingly, the problem presented with the advent of 3G CDMA wireless involves the manner in which to allocate Walsh codes while ensuring the mutual orthogonality of all the concurrently used codes for the same sector/carrier within a given cell site. A solution to the problem of Walsh code allocation in 3G CDMA wireless is disclosed in the U.S. patent application of Bugress, et al., entitled "WALSH CODE ALLOCATION/DE-ALLOCATION SYSTEM AND METHOD," filed May 16, 2001, incorporated by reference herein, in its entirety.

While the solution presented in the aforementioned patent application is accurate and robust, it remains generally desirable to have a system and/or method in which to monitor or test an allocation system to ensure that code orthogonality is being maintained thereby. That is to say, at times allocations systems may break down and code orthogonality may be lost, as a result, dropped calls and/or interference may be experienced. These symptoms, however, may also result from other causes. Accordingly, to isolate the cause of the dropped calls and/or interference, it is desirable to have a tool to verify that the allocation system is operating properly with respect to code orthogonality. Additionally, in developing an allocation system, it is often desirable to test the allocation system to ensure that is maintains code orthogonality prior to actually implementing the allocation system. Debugging problems in real time when there is an actual call load present is difficult and often impractical.

The present invention contemplates a new and improved system and/or method for checking the allocation of Walsh codes to verify orthogonality which overcomes and/or minimizes the above-referenced problems and others.

SUMMARY OF THE INVENTION

In accordance with one aspect of the present invention, a method of verifying that a CDMA code allocator maintains mutual orthogonality between all concurrently busy codes is provided. The method includes identifying a code being allocated by the allocator, and determining if the identified code is busy. It is also determined if any ancestral parent of the identified code is busy, and if any descendant of the identified code is busy. If the identified code, one of the identified code's ancestral parents, or one of the identified code's descendants is determined to be busy, then an error in allocator operation is indicated.

In accordance with another aspect of the present invention, an allocator testing system is provided for testing a Walsh code allocator to verify that its operation maintains mutual orthogonality between all concurrently busy Walsh codes. The allocator testing system includes a call generator and a verification module, The call generator drives the allocator being tested and provides an input thereto with a pattern of channel openings and closings. The allocator responses to the call generator by outputs Walsh code allocations. The verification module is arranged to receive the allocator outputs. The verification module determines for each Walsh code allocation whether or not it would result in at least two non-orthogonal Walsh codes being concurrently busy.

One advantage of the present invention resides in the ability to verify proper operation of a CDMA code allocator with respect to maintaining mutual orthogonality between all concurrently busy codes. In selected embodiments, another advantage of the present invention resides in the ability to test allocator operations in a virtual or simulated environment. One other advantage achieved by selected embodiments of the present invention resides in the ability to aid in isolating the cause of dropped calls, interference and/or cross-talk between different channels.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT(S)

Figure 1:
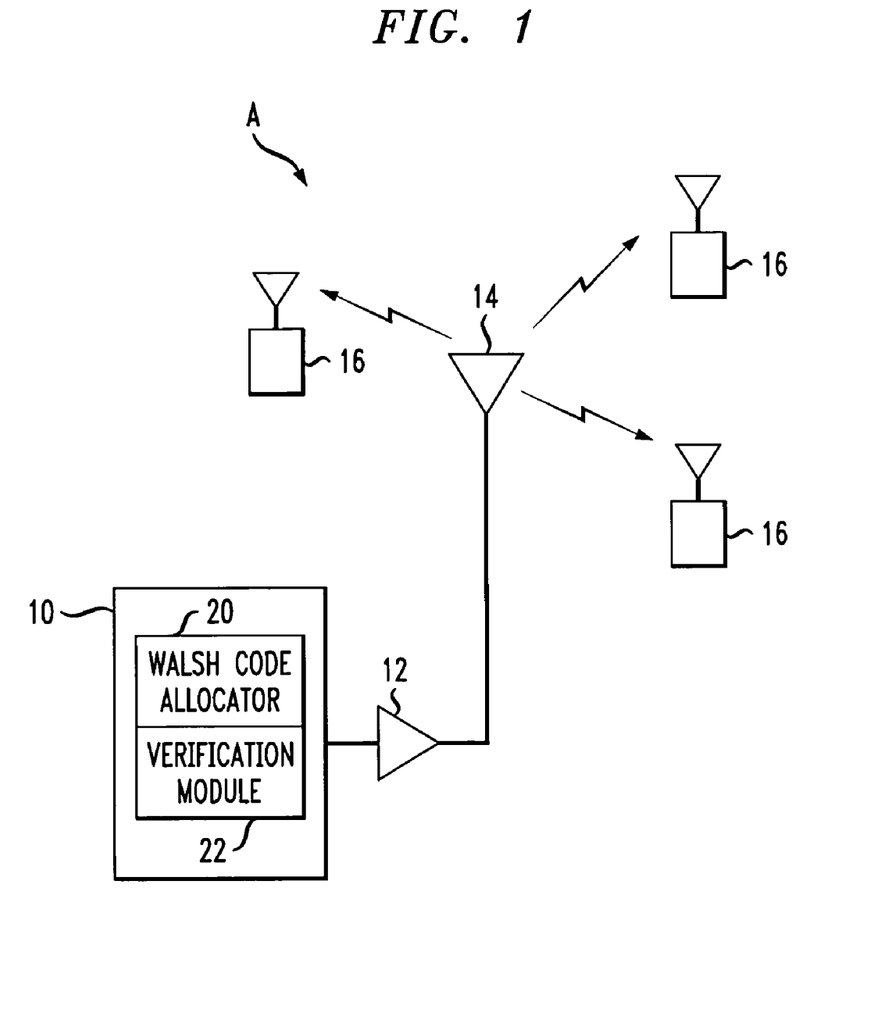
FIG. 1 is a diagrammatic illustration showing a telecommunications network incorporating a Walsh code allocator of the type whose operation is monitored or checked via a verification module in accordance with aspects of the present invention.
Figure 2A:
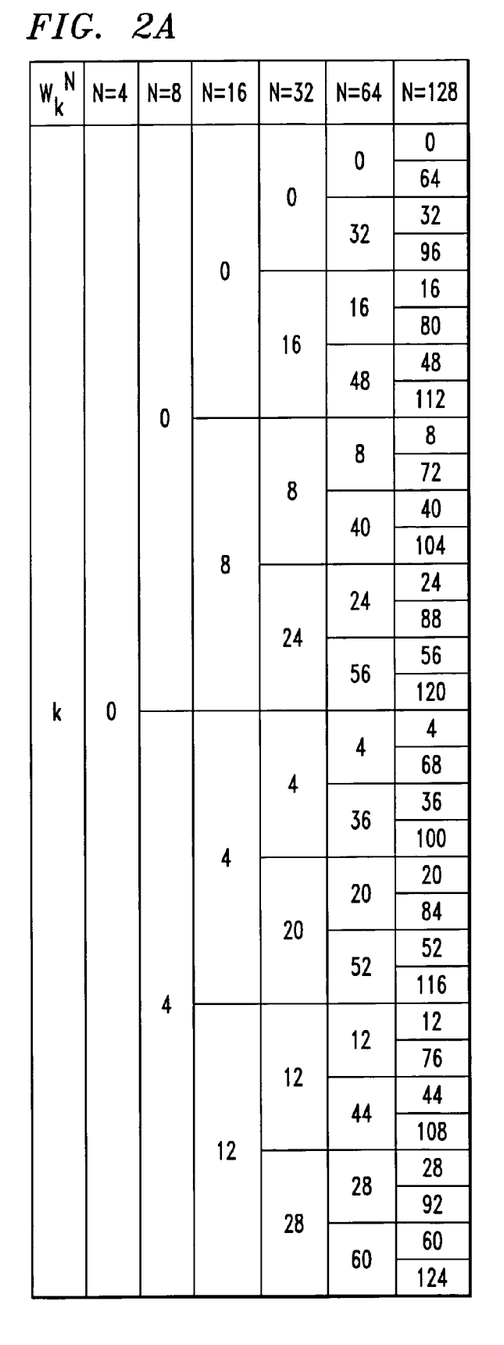
FIG. 2 is a table of Walsh codes used by the Walsh code allocator and/or verification module in accordance with aspects of the present invention.
Figure 2B:
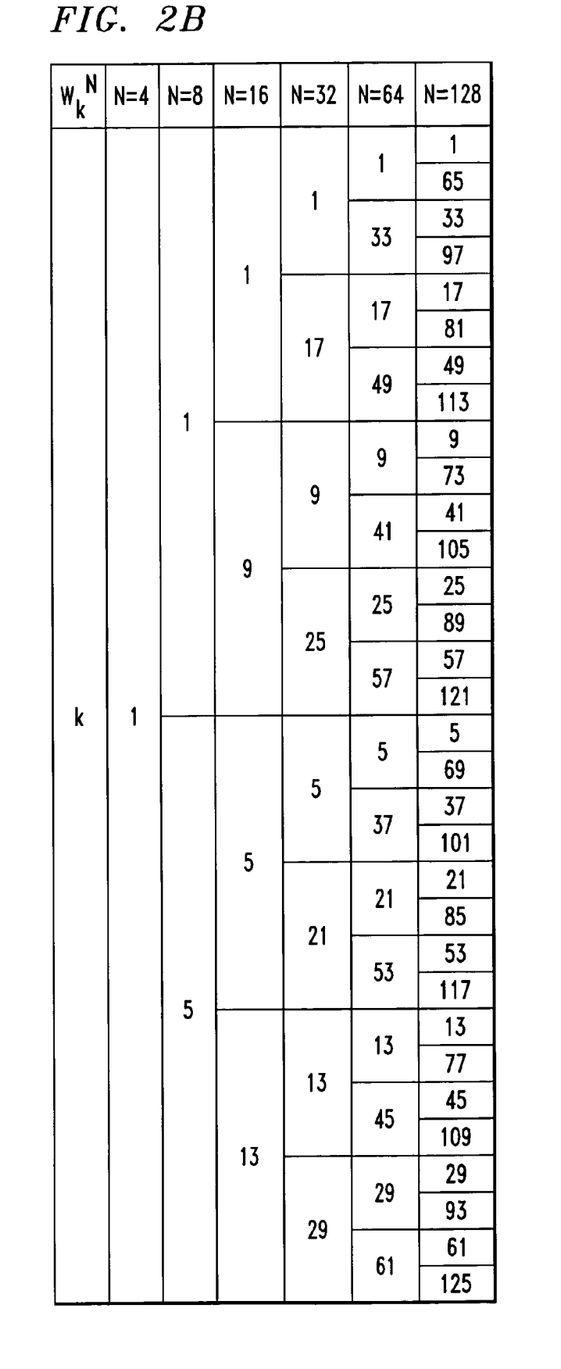
Figure 2C:
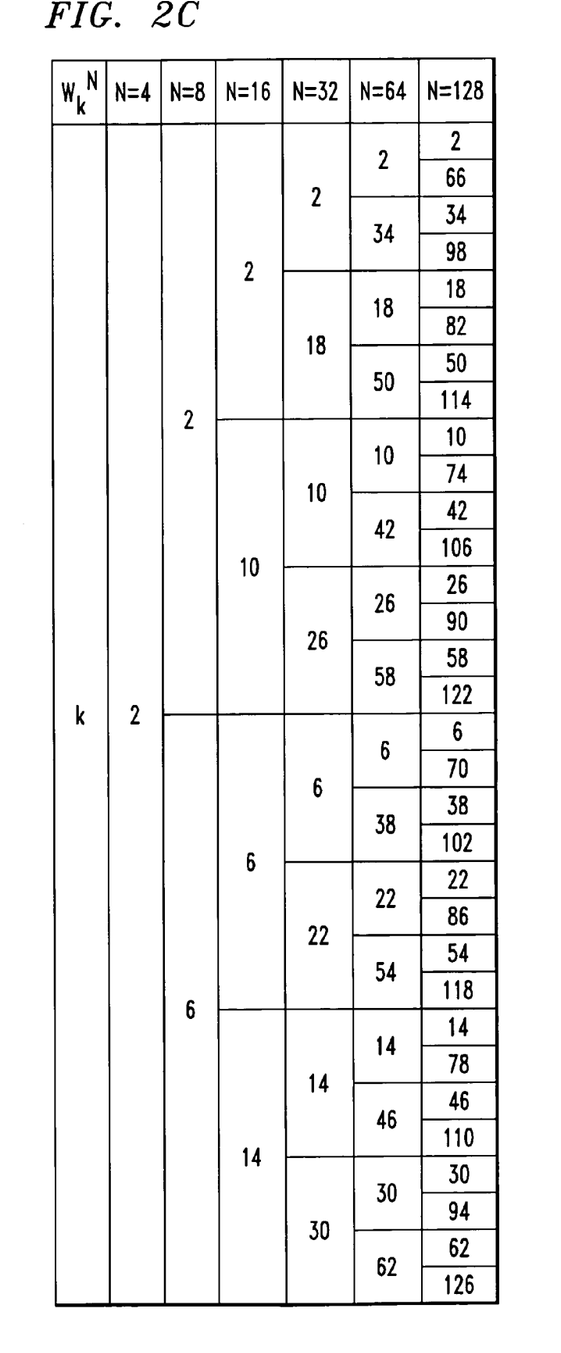
Figure 2D:
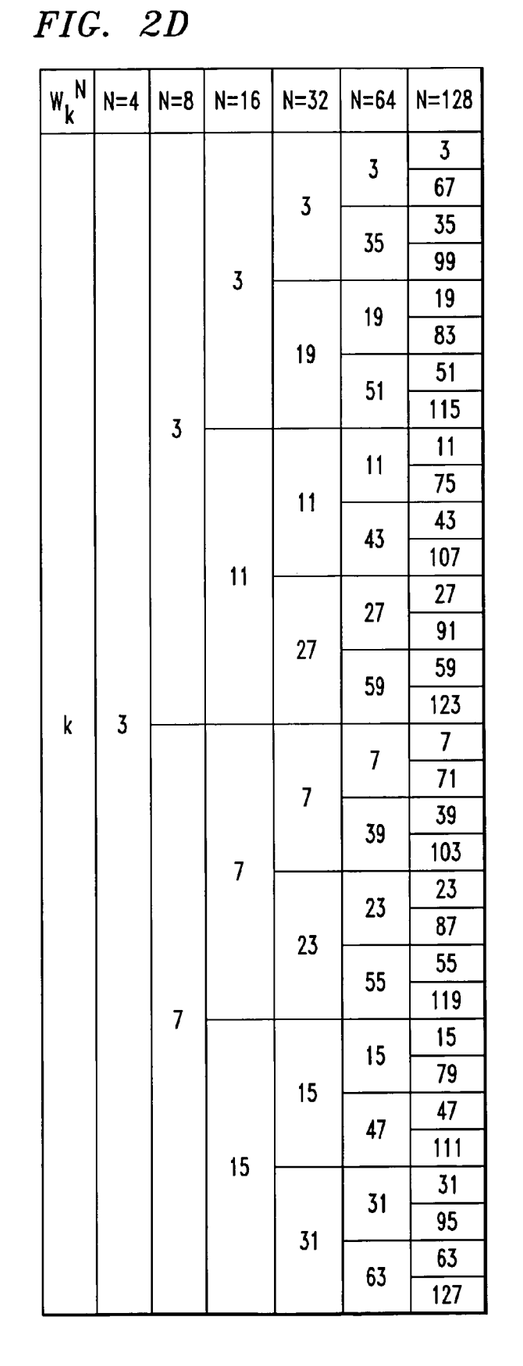

FIG. 1 shows at least a portion of a wireless telecommunications network A including a cell base station 10 with a signal amplifier 12 and a transmit/receive antenna 14 and a plurality of mobile targets or stations 16 (e.g., wireless phones, wireless PDAs, etc.). With the exception of the novel verification module of the present invention, the network A is well known and its operation and configuration is readily understood by those skilled in the art. It preferably implements 3G wireless CDMA technology in the usual manner.

In accordance with a preferred embodiment of the present invention, the base station 10 includes a Walsh code allocator 20 which assigns or designates selected Walsh codes/ functions to the network traffic relayed over the air interface between the base station 10 and the mobile stations 16 such that at any given time each channel thereon is associated with a corresponding Walsh code/function. When operating properly, the Walsh code allocator 20 allocates Walsh codes such that all the concurrently used or busy Walsh codes for the same sector/carrier in a cell site are unique and mutually orthogonal. In this manner, a plurality of different channels existing concurrently between the base station 10 and mobile stations 16 can be isolated and distinguished. The Walsh code allocator 20 is optionally implemented via a hardware configuration, a software configuration or a combination of both. For example, the Walsh code allocator 20 is optionally embodied in a dedicated microprocessor (application specific or otherwise), a software object implemented via or running on the base station's existing hardware or processors, or some combination thereof. In one preferred embodiment, the allocator 20 also de-allocates codes.

In a preferred embodiment, the base station 10 also includes a verification module 22 that monitors and/or checks the operation of the allocator 20 to ensure that it is operating properly, i.e., to verify that the allocator 20 is assigning Walsh codes in such a manner so as to maintain a state of mutual orthogonality between concurrently busy Walsh codes for the same sector/carrier in the cell site. As with the allocator 20, the verification module 22 is implemented via a configuration of hardware, software or a combination thereof. The module 22 is optionally incorporated in one or more dedicated microprocessors and associated hardware, or resides and/or runs on otherwise existing systems and hardware within the site or base station 10.

In a preferred embodiment, the module 22 is a detachable/ mobile tool which is selectively linked to the cell site for monitoring and/or testing. Alternately, the module 22 is incorporate and/or permanently resides at the site or base station 10. In the latter embodiment, preferably, the module 22 may be selectively engaged and disengaged so that monitoring of the allocator 20 is selectively achieved only when desired.

In another preferred embodiment, the module 22 is part of and/or incorporated into a simulated or virtual environment used to test and/or monitor the operation of allocators 20. Likewise, the allocator itself may be simulated or virtual.

With reference to FIG. 2, in accordance with aspects of the present invention, an exemplary table or matrix including all the Walsh codes used by the Walsh code allocator 20 being tested is shown. Optionally, the table is a look up table (LUT) accessed by the allocator 20 and/or module 22. In this example, six Walsh code sizes are used, namely, $W^4$, $W^8$, $W^{16}$, $W^{32}$, $W^{64}$ and $W^{128}$. The various sizes correspond to the table columns. Within each size there are a number of orthogonal Walsh codes, the number being equal to the size. That is, $W^4$ includes 4 Walsh codes which are mutually orthogonal to one another and each has a bit length of 4, they are individually referenced by k=0, 1, 2 and 3; $W^8$ includes 8 Walsh codes which are mutually orthogonal to one another and each has a bit length of 8, they are individually referenced by k=0, 1, 2, 4, 5, 6 and 7; and so on for each size.

The table shown is arranged into four binary trees extending from left to right. Each tree is a Walsh Code Family (WCF) designated by its root node, i.e., the $W_0^4$ family, $W_1^4$ family, $W_2^4$ family and $W_3^4$ family. Optionally, for the purposes of the verification module 22, the table may be expressed in terms of any number of one or more families. For example, the table may be expressed as one large family containing all the Walsh codes potentially used by the allocator 20 being tested or monitored.

For purposes of the description herein, the following terms are being defined. A "busy" code is any Walsh code that has been allocated and is still presently allocated or assigned to a channel. An "idle" code is any Walsh code which is not currently busy. The respective relationships between Walsh codes are describe with reference to parents, children and siblings. Each parent Walsh code has two children Walsh codes which are siblings to one another. In the table, the two children of any parent are the two Walsh codes immediately adjacent and to the right of the parent. The Walsh codes are arranged in the table such that the descendants or progeny (i.e., the children, grandchildren, great-grandchildren, etc.) of any parent Walsh code are not orthogonal to that parent. Likewise, the parental ancestors (i.e., the parent, grandparent, great-grandparent, etc.) of any child are not orthogonal to that child. Siblings, however, are orthogonal. In other words, siblings are any pair of mutually orthogonal Walsh codes of the same size which are both non-orthogonal children to the same parent Walsh code of the immediately smaller size (i.e., half their size). Accordingly, when the allocator 20 under consideration is operating properly, only idle codes should be allocated. Additionally, the progeny and parental ancestors thereof should also be idle.

Figure 3:
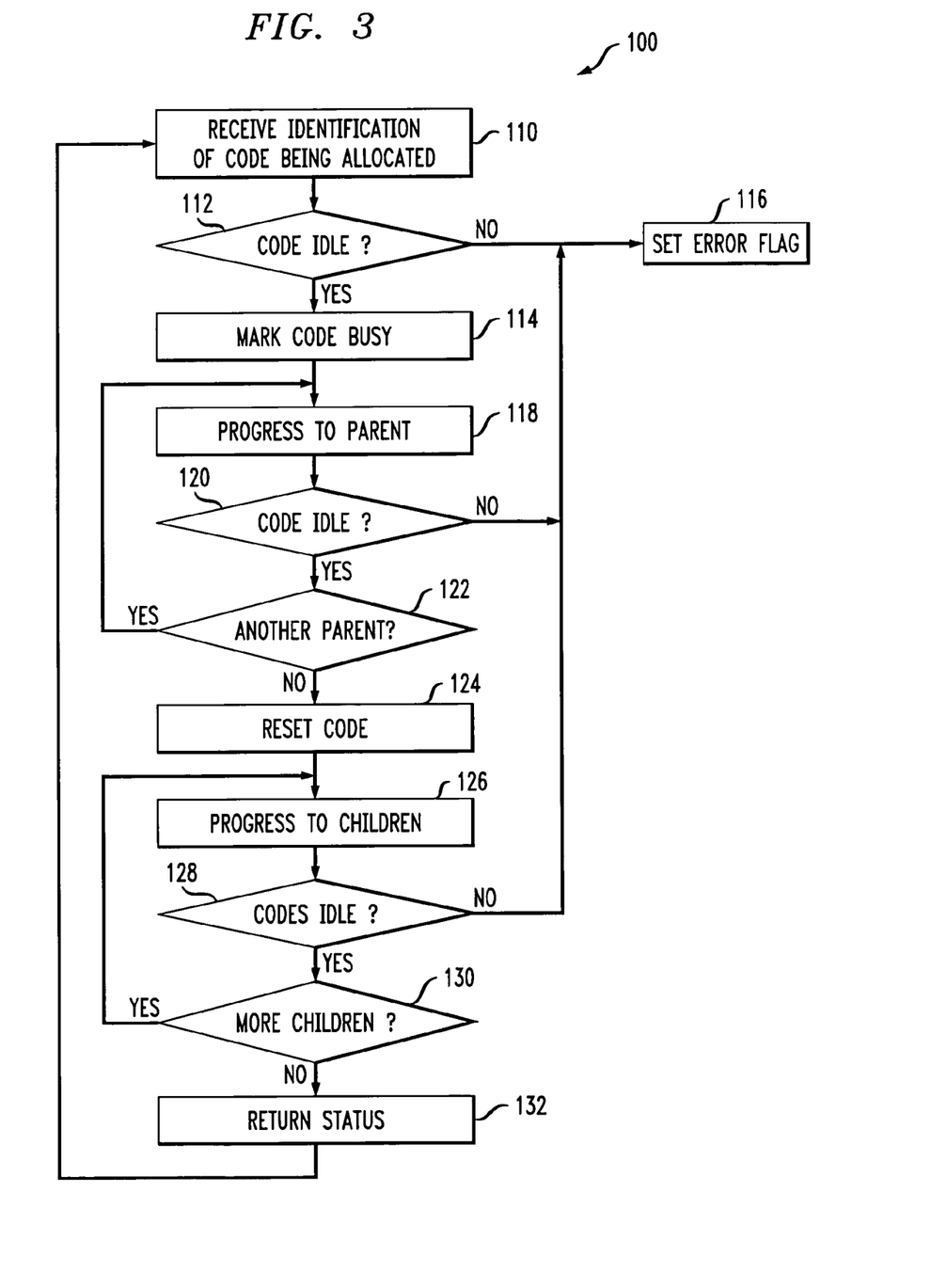
FIG. 3 is a flow chart showing a verification process carried out in accordance with aspects of the present invention.

In accordance with a preferred embodiment of the present invention, the flow chart of FIG. 3 illustrates the verification process 100 carried out by the module 22, i.e., the method by which the allocator 20 is tested or monitored to verify its operation with respect to maintaining mutual orthogonality of concurrently busy codes. The process 100 begins at step 110 with the module 22 receiving the identification of a code being allocated. The identification is received when the allocator 20 being monitored is allocating or would otherwise dispense a code, for example, in connection with the establishment of a new channel, be it an overhead channel, a fundamental channel of voice or data traffic, or otherwise. Optionally, the allocator 20 being studied is stimulated or driven by an artificial call generator, i.e., a simulated or virtual call generator which emulates a random or selected pattern of calls. The pattern of calls, referred to as the call scenario, represents the opening and closing of various channels which the allocator is responsible for organizing via the allocation and/or assignment of Walsh codes. In any event, the identification preferably indicates the particular code output by the allocator 20 being studied as well as its size. That is, it preferably indicates the values of k and N.

Figure 4:
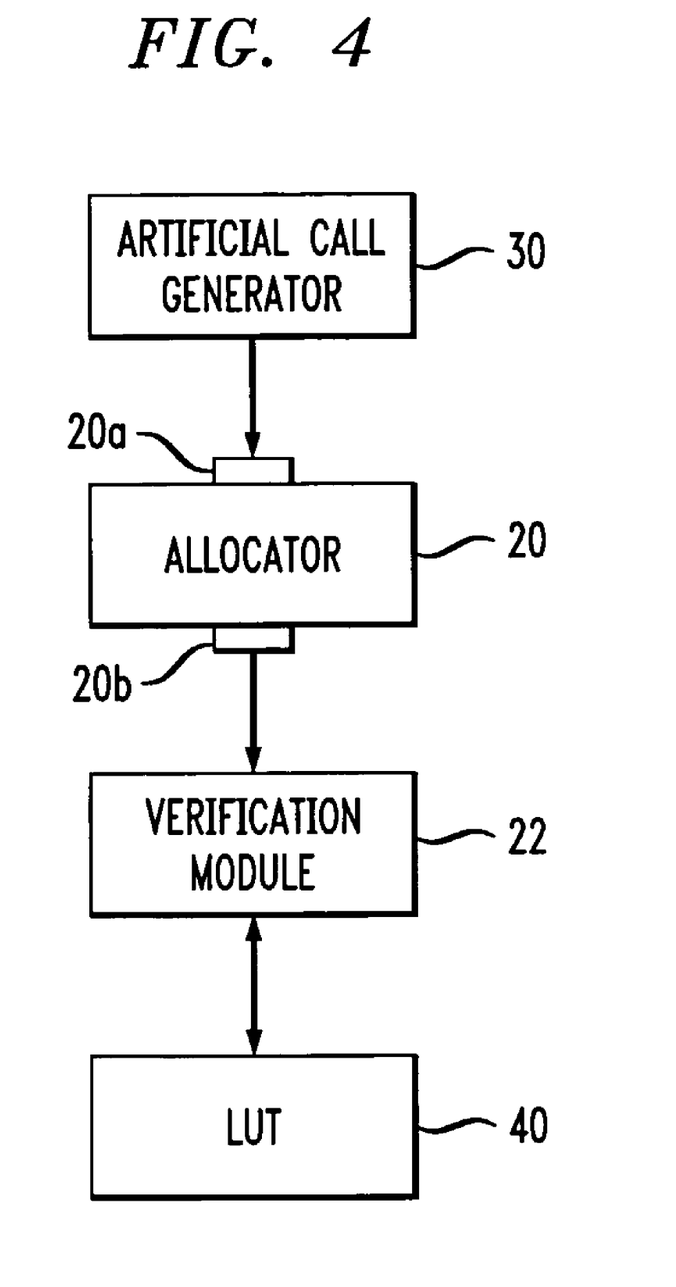
FIG. 4 is a diagrammatic illustration showing an arrangement of components in an exemplary test environment for verifying the operation of a CDMA code allocator in accordance with aspects of the present invention.

With reference to FIG. 4, a preferred configuration of components is shown for an exemplary testing environment. The artificial call generator 30 stimulates or drives the input 20a to the allocator 20 (be it a virtual simulation of the allocator or the actual allocator). The verification module 22 is arranged to receive the resulting Walsh code allocations from the allocator'S output 20b. The verification module 22 selectively accesses a memory 40, or other like storage device, which has maintained therein the current states of various Walsh codes, e.g., busy, idle, etc. Preferably, the memory 40 comprises a LUT such as the one shown in FIG. 2. In accordance with the process 100 shown in FIG. 3, when assessing the memory 40, the verification module 22 updates the information or data stored therein and/or identifies the current state of selected codes based on the codes received from the allocator 20.

In any event, with reference again to FIG. 3, at decision step 112, it is determined if the identified code is currently idle. If the determination of step 112 is positive or yes, the process 100 branches to step 114, otherwise if the determination is negative or no, the process 100 branches to step 116. At step 114, the identified code is marked or designated as busy, optionally, in a module-accessible LUT like the one shown in FIG. 2. On the other hand, at step 116, an error flag is set indicating that as a result of the allocation just made the allocator 20 being studied has failed to maintain mutual orthogonality between busy codes. The determination of step 112 is preferably made by comparing the identified code to its corresponding entry in the LUT which is maintained, updated and/or accessible by the module 22. In a preferred embodiment, each code in the LUT is designated or marked with its current state, i.e., busy or idle. Optionally, the LUT information is maintained in the form of a table, records, lists, a database, or the like which is stored in an addressable memory or other similar storage device.

Upon reaching step 116, the process 100 preferably ceases and the relevant historical data and information is saved to that the scenario may be recreated and studied to determine the source of the allocator's failure.

Following step 114, the process 100 progresses, at step 118, from the code just considered to its parent. The foregoing progression is preferably achieved by setting N equal to N/2 and then setting k equal to k%N. Thereafter, it is determined at decision step 120 if the current code (i.e., the parent of the originally identified code) is idle. Again, similar to decision step 112, the decision of step 120 is preferably made by comparing the code being considered to the LUT. If the determination of decision step 120 is negative or no, then the process 100 branches to step 116 described above, otherwise if the determination of decision step 120 is positive or yes, then the process 100 continues on with decision step 122.

At decision step 122, it is determined if a parent of the current code under consideration exists. Preferably, this is achieved by determining if the smallest size of Walsh code has been reached, i.e., in this example, determining if N is greater than 4. If a parent of the current code under consideration does exist (i.e., N is greater than 4), then the determination of step 122 is positive or yes and the process 100 loops back to step 118, otherwise if no parent of the current code under consideration exists (i.e., N is equal to 4), then the determination of step 122 is negative or no and the process 100 continues on to step 124.

Steps 118 through 122, in effect, operate to successively check the parental ancestors of the code originally identified in step 110 to find out if the parental ancestors thereof are all idle. The iterative loop starts with the immediate parent of the originally identified code, and with each iteration, it progresses or steps to the grandparent, great-grandparent, great-great-grandparent, etc. The loop is broken or terminated by advancing to step 116 when an ancestral parent is found (at step 120) to be busy or not idle, or by advancing to step 124 when the smallest size Walsh code is reached (i.e., no more ancestral parents exist as determined in step 122) and none of the ancestral parents have been found to be busy or not idle. In this manner, the operation of the allocator 20 being studied is examined to verify whether or not it is outputting codes which are descendants or progeny of busy codes. If it is, the error flag is set at step 116.

At step 124, the originally identified code is reset as the code under consideration. Preferably, this is achieved by resetting k and N, respectively, back to the original values obtained via step 110.

Following step 124, the process 100 progresses, at step 126, from the code just considered to its children. The foregoing progression is preferably achieved by setting k equal to both k and k+N and then setting N equal to N*2. It is determined at decision step 128 if the current codes (i.e., the children of the originally identified code) are idle. Again, similar to decision step 112, the decision of step 128 is preferably made by comparing the codes being considered to the LUT. If the determination of decision step 128 is negative or no for any of the codes under consideration, then the process 100 branches to step 116 described above, otherwise if the determination of decision step 128 is positive or yes for all the codes under consideration, then the process 100 continues on with decision step 130.

At decision step 130, it is determined if children of the current codes under consideration exist. Preferably, this is achieved by determining if the largest size of Walsh code has been reached, i.e., in this example, determining if N is less than 128. If children of the current codes under consideration do exist (i.e., N is less than 128), then the determination of step 130 is positive or yes and the process 100 loops back to step 126, otherwise if no children of the current codes under consideration exist (i.e., N is equal to 128), then the determination of step 130 is negative or no and the process 100 continues on to step 132.

Steps 126 through 130, in effect, operate to successively check the progeny of the code originally identified in step 110 to find out if the progeny thereof are all idle. The iterative loop starts with the immediate children of the originally identified code, and with each iteration, it progresses or steps to the grandchildren, great-grandchildren, great-great-grandchildren, etc. The loop is broken or terminated by advancing to step 116 when a child is found (at step 128) to be busy or not idle, or by advancing to step 132 when the largest size Walsh code is reached (i.e., no more descendants exist as determined in step 130) and none of the progeny have been found to be busy or not idle. It is to be noted, that with each iteration of this loop (steps 126 through 130) the number of codes under consideration doubles due to the fact that there are two children for each considered code in the immediately preceding iteration. For example, given the values of $k=k_0$ and $N=N_0$ for the code originally identified in step 110: upon the first iteration of the loop comprising steps 126 through 130, the codes under consideration are $k_0$ and $k_0+N_0$ both of size $N_0*2$; upon the second iteration, the codes under consideration are $k_0$, $k_0+N_0$, $k_0+2N_0$ and $k_0+3N_0$ all of size $N_0*4$; upon the second iteration, the codes under consideration are $k_0$, $k_0+N_0$, $k_0+2N_0$, $k_0+3N_0$, $k_0+4N_0$, $k_0+5N_0$, $k_0+6N_0$ and $k_0+7N_0$ all of size $N_0*8$; etc. In this manner, the operation of the allocator 20 being studied is examined to verify whether or not it is outputting codes which are the progeny of busy codes. If it is, the error flag is set at step 116.

At step 132, the status is returned indicating that the allocation just performed by the allocator 20 being studied did in fact maintain the mutual orthogonality of the currently busy Walsh codes. Optionally, for diagnostic and/or trouble shooting purposes, a historical record of the returned status is saved each time it is returned. After step 132, the process loops back to step 110 where it awaits the next operation, be it an allocation or a de-allocation.

In addition to monitoring allocation, the verification module 22 also preferably receives de-allocation notifications whereby it updates the LUT to indicate that previously busy codes which are de-allocated are now idle. That is to say, e.g., when a channel is closed the previously busy code associated therewith becomes available or idle. In response thereto, the verification module 22 marks or designates the corresponding code in the LUT as idle. Preferably, the particular code being deallocated is indicated to the verification module 22 via an identification of the same received from the allocator 20.

The invention has been described with reference to the preferred embodiments. Obviously, modifications and alterations will occur to others upon reading and understanding the preceding detailed description. For example, the present invention is applicable to and/or readily implemented in connection with a variety of network environments and/or protocols, such as, Universal Mobil Telecommunications System (UMTS) and the like. In any event, it is intended that the invention be construed as including all such modifications and alterations insofar as they come within the scope of the appended claims or the equivalents thereof.

What is claimed is:

1. A method of verifying that a CDMA code allocator maintains mutual orthogonality between all concurrently busy codes, said method comprising:
    (a) monitoring the allocator to identify a code being allocated by the allocator;
    (b) determining if the identified code is busy;
    (c) determining if any ancestral parent of the identified code is busy; and,
    (d) determining if any descendant of the identified code is busy;
wherein, if at least one of: the identified code; one of the identified code's ancestral parents; or, one of the identified code's descendants; is determined to be busy, then an error in allocator operation is indicated.

2. The method according to claim 1, further comprising:
    stimulating the allocator with an artificial call generator; and,
    monitoring an output of the allocator to identify the codes being allocated by the allocator.

3. The method according to claim 1, wherein the allocator is simulated.

4. The method according to claim 1, wherein the determinations of steps (b), (c) and (d) are made by accessing a storage device in which current code states are maintained.

5. The method according to claim 4, wherein the storage device comprises a LUT arranged as a binary tree of codes in which each parent code is a common node for its two children codes.

6. The method according to claim 1, further comprising:
    repeating steps (a) through (d) each time a code is allocated by the allocator; and,
    saving a historical record of the allocator's operation with respect to maintaining mutual orthogonality between all concurrently busy codes.

7. The method according to claim 6, further comprising:
    designating code states such that an otherwise idle code is designated as busy when the code is allocated, and an otherwise busy code is designated as idle when the code is de-allocated.

8. The method according to claim 6, wherein the designations of code states are maintained in a storage device which is accessed to make the determinations of steps (b), (c) and (d).

9. The method according to claim 8, wherein the storage device comprises a LUT arranged as a binary tree of codes in which each parent code is a common node for its two children codes.

10. An allocator testing system for testing a Walsh code allocator to verify that its operation maintains mutual orthogonality between all concurrently busy Walsh codes, said allocator testing system comprising:
    a call generator which drives an allocator being tested, said call generator providing an input of the allocator with a pattern of channel openings and closings in response to which the allocator outputs Walsh code allocations; and,
    a verification module arranged to receive the allocator outputs, said verification module determining for each Walsh code allocation whether or not it would result in at least two non-orthogonal Walsh codes being concurrently busy.

11. The allocator testing system according to claim 10, further comprising:
a storage device which is accessed by the verification module to determine whether or not a Walsh code allocation would result in at least two non-orthogonal Walsh codes being concurrently busy, said storages device maintaining current states of Walsh codes.

12. The allocator testing system according to claim 11, wherein the storage device comprises a LUT arranged as a binary tree of Walsh codes in which each parent Walsh code is a common node for its two children Walsh codes.

13. The allocator testing system according to claim 10, wherein the verification module determines whether or not an allocated Wash code is busy, whether or not an ancestral parent of an allocated Walsh code is busy, and whether or not a descendant of an allocated Walsh code is busy, such that if at least one of the foregoing is determined to be busy, then an error in the allocator's operation is indicated.

14. The allocator testing system according to claim 10, wherein the call generator is an artificial call generator.

15. The allocator testing system according to claim 10, wherein the allocator being tested is a simulated allocator.

16. The allocator testing system according to claim 10, further comprising:
a storage device in which current states of Walsh codes are maintained, wherein the verification module accesses the storage device to determine whether or not a Wash code being allocated is busy, whether or not an ancestral parent of a Walsh code being allocated is busy, and whether or not a descendant of a Walsh code being allocated is busy, such that if at least one of the foregoing is determined to be busy, then an error in the allocator's operation is indicated.

* * * * *